United States Patent
Endo et al.

(10) Patent No.: US 10,474,005 B2
(45) Date of Patent: Nov. 12, 2019

(54) IMAGING UNIT AND IMAGING SYSTEM

(71) Applicant: FUJI XEROX CO., LTD., Tokyo (JP)

(72) Inventors: Keiji Endo, Yokohama (JP); Tadashi Masuda, Minamiashigara (JP)

(73) Assignee: FUJI XEROX CO., LTD., Tokyo (JP)

( * ) Notice: Subject to any disclaimer, the term of this patent is extended or adjusted under 35 U.S.C. 154(b) by 43 days.

(21) Appl. No.: 15/469,041

(22) Filed: Mar. 24, 2017

(65) Prior Publication Data

US 2017/0199445 A1 Jul. 13, 2017

Related U.S. Application Data

(63) Continuation of application No. PCT/JP2015/064084, filed on May 15, 2015.

(30) Foreign Application Priority Data

Dec. 10, 2014 (JP) .................. 2014-250154

(51) Int. Cl.
*G03B 15/05* (2006.01)
*H04N 5/225* (2006.01)
(Continued)

(52) U.S. Cl.
CPC .......... *G03B 15/05* (2013.01); *G02B 13/001* (2013.01); *G03B 11/045* (2013.01);
(Continued)

(58) Field of Classification Search
CPC .... G03B 15/05; G03B 11/045; G03B 17/565; G03B 2215/0525; G02B 13/001;
(Continued)

(56) References Cited

U.S. PATENT DOCUMENTS 7,224,501 B2 * 5/2007 Kojima ................ G02B 6/0018
359/16
8,279,544 B1 * 10/2012 O'Neill .................... G02B 7/14
359/827
(Continued)

FOREIGN PATENT DOCUMENTS

CN 102804018 A 11/2012
DE 10146158 A1 4/2003
(Continued)

OTHER PUBLICATIONS

Sep. 25, 2018 Office Action issued in Japanese Patent Application No. 2014-250154.

(Continued)

*Primary Examiner* — Bao Q Truong
(74) *Attorney, Agent, or Firm* — Oliff PLC (57) ABSTRACT

An imaging unit includes: an attachment member that is attached to a mobile terminal which includes an imaging section and a lighting section; a lens section that is disposed at a position corresponding to the imaging section of the mobile terminal and closes up a target; and an optical member that guides illumination light from the lighting section, from the lighting section of the mobile terminal toward the target rather than an end of the lens section on a side of the target.

17 Claims, 12 Drawing Sheets

(51) Int. Cl.
    *G02B 13/00*     (2006.01)
    *G03B 11/04*     (2006.01)
    *G03B 17/56*     (2006.01)

(52) U.S. Cl.
    CPC .......... *G03B 17/565* (2013.01); *H04N 5/225* (2013.01); *H04N 5/2254* (2013.01); *H04N 5/2256* (2013.01); *G03B 2215/0525* (2013.01)

(58) Field of Classification Search
    CPC .... H04N 5/225; H04N 5/2254; H04N 5/2256; F21V 1/00; F21V 1/16; F21V 1/24; F21V 7/00; F21V 7/28; F21V 13/00; F21V 13/12; F21V 2200/00; F21V 2200/13
    See application file for complete search history.

(56) References Cited

U.S. PATENT DOCUMENTS

| | | | | |
|---|---|---|---|---|
| 8,559,811 | B1* | 10/2013 | Lin | G03B 15/05 396/177 |
| 9,325,884 | B2* | 4/2016 | Fletcher | H04M 1/21 |
| 2006/0209417 | A1 | 9/2006 | Kojima | G02B 6/0018 359/618 |
| 2008/0117421 | A1 | 5/2008 | Yamaguchi et al. | |
| 2012/0236425 | A1 | 9/2012 | O'Neill | |
| 2012/0273688 | A1* | 11/2012 | Tsai | G01T 1/023 250/370.07 |
| 2013/0002939 | A1 | 1/2013 | O'Neill | |
| 2013/0083185 | A1* | 4/2013 | Coleman, III | A61B 3/12 348/78 |
| 2013/0102359 | A1 | 4/2013 | Ho | |
| 2013/0135759 | A1 | 5/2013 | O'Neill | |
| 2013/0300919 | A1* | 11/2013 | Fletcher | H04M 1/21 348/360 |
| 2014/0253789 | A1 | 9/2014 | O'Neill | |
| 2014/0320987 | A1 | 10/2014 | O'Neill | |
| 2016/0103292 | A1 | 4/2016 | O'Neill | |
| 2017/0351056 | A1 | 12/2017 | O'Neill | |

FOREIGN PATENT DOCUMENTS

| | | |
|---|---|---|
| JP | 2004-279733 A | 10/2004 |
| JP | 2006-259159 A | 9/2006 |
| JP | 2012-198236 A | 10/2012 |
| WO | 2012-058641 A2 | 5/2012 |
| WO | 2013/148367 A1 | 10/2013 |
| WO | 2013/190985 A1 | 12/2013 |

OTHER PUBLICATIONS

Mar. 22, 2018 Search Report issued in European Patent Application No. 15867733.6.
Jul. 28, 2015 International Search Report issued in International Patent Application No. PCT/JP2015/064084.
Jun. 13, 2017 International Preliminary Report on Patentability issued in International Patent Application No. PCT/JP2015/064084.
Nov. 1, 2018 Office Action issued in Chinese Patent Application No. 201580060550.5.
May 28, 2019 Summons to Attend Oral Proceeding issued in European Patent Application No. 15867733.6.

* cited by examiner

IMAGING UNIT AND IMAGING SYSTEM

CROSS REFERENCE TO RELATED APPLICATION

This is a continuation of International Application No. PCT/JP2015/064084 filed on May 15, 2015, and claims priority from Japanese Patent Application No. 2014-250154, filed on Nov. 10, 2014.

BACKGROUND

Technical Field

The present invention relates to an imaging unit and an imaging system.

SUMMARY

According to an aspect of the present invention, there is provided an imaging unit including: an attachment member that is attached to a mobile terminal which includes an imaging section and a lighting section; a lens section that is disposed at a position corresponding to the imaging section of the mobile terminal and closes up a target; and an optical member that guides illumination light from the lighting section, from the lighting section of the mobile terminal toward the target rather than an end of the lens section on a side of the target.

BRIEF DESCRIPTION OF DRAWINGS

Exemplary embodiment(s) of the present invention will be described in detail based on the following figures, wherein.

DETAILED DESCRIPTION

Hereinafter, imaging systems and imaging units according to respective exemplary embodiments of the present invention will be described with the accompanying drawings.

First Exemplary Embodiment

Figure 1:
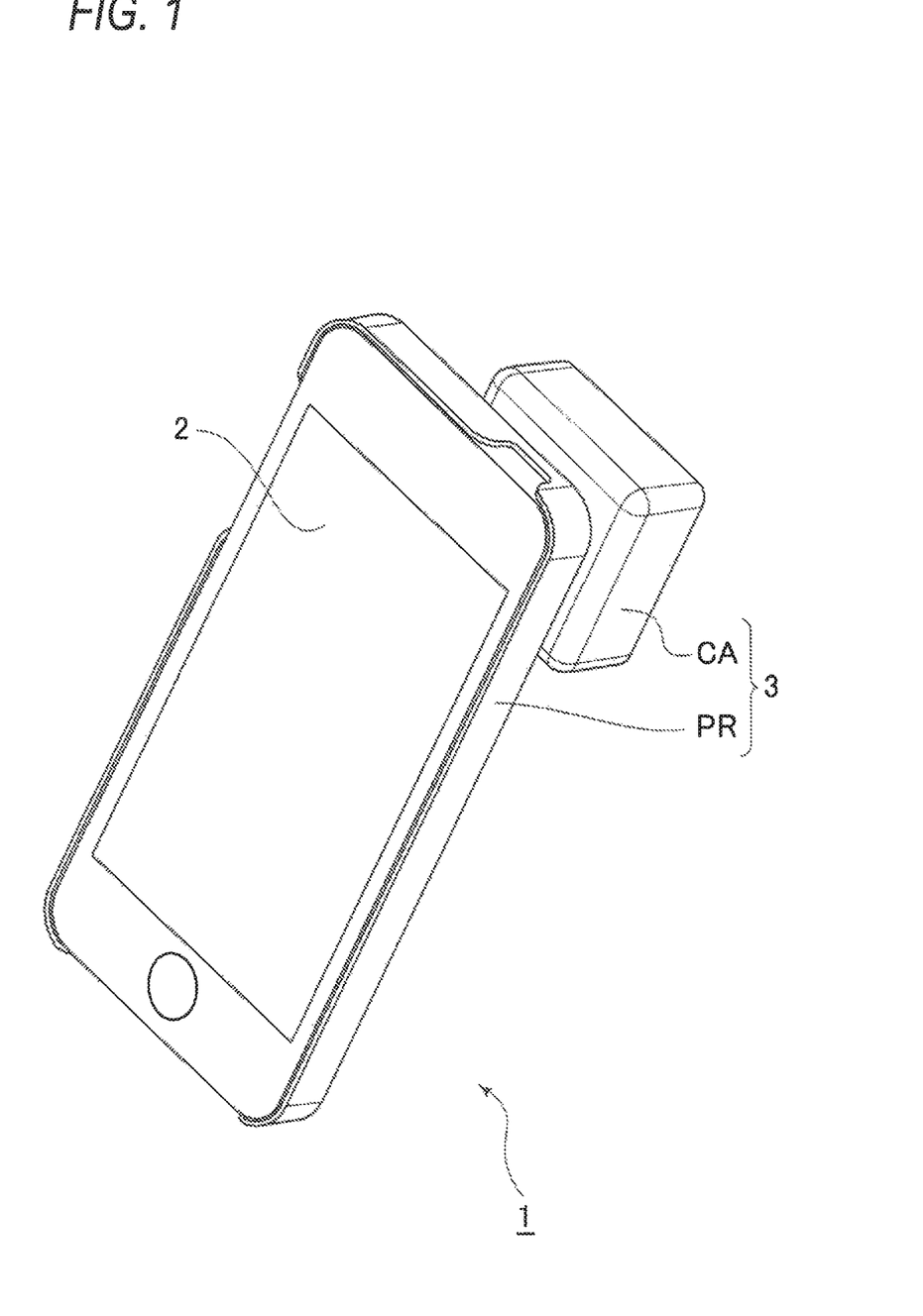
FIG. 1 is a perspective view schematically illustrating an imaging system according to a first exemplary embodiment.

FIG. 1 is a perspective view schematically illustrating an imaging system according to a first exemplary embodiment. In an imaging system 1 according to the first exemplary embodiment, an imaging unit 3 is attached to a portable mobile terminal 2 that includes an imaging section (camera function) and a lighting section (flash function). In addition, the imaging unit 3 includes an attachment member PR that is fitted and fixed to an external shape of the mobile terminal 2, and a case CA of closing-up imaging.

Although the mobile terminal 2 according to the exemplary embodiment is implemented by a mobile phone, such as a smart phone, the mobile terminal 2 may be realized by a tablet terminal, which includes an imaging section and a lighting section. In addition, the mobile terminal 2 includes a display and a touch panel in addition to a microprocessor, a storage section which is formed by a storage medium, such as a RAM or a hard disk drive, a communication interface, and an operation button, and includes an imaging section and a lighting section on a rear surface of the display.

Meanwhile, the attachment member PR is formed with an opening in a location of the imaging section of the mobile terminal 2, and a close-up image is acquired from the imaging section through the opening and a lens section LZ that is disposed inside the ease CA of closing-up imaging. In addition, similarly, the attachment member PR is formed with an opening in a location of the lighting section of the mobile terminal 2, and illumination light is supplied to an optical member OP, which is disposed inside the case CA of closing-up imaging, through the opening.

The imaging section of the mobile terminal 2 includes imaging elements, such as a charge coupled device (CCD) image sensor and a complementary metal oxide semiconductor (CMOS) image sensor, an optical system such as a lens, and the like, and acquires image data by capturing an image of a subject (target). In addition, an optical axis of the optical system of the imaging section is in a direction that is approximately perpendicular to a rear surface of the mobile terminal 2.

The lighting section of the mobile terminal 2 includes, for example, a light emitting diode (LED) as a light emitting element. The lighting section according to the exemplary embodiment emits light in a case where an image is acquired by the imaging section.

In addition, in the imaging system 1 according to the exemplary embodiment, an application program for acquiring a close-up image is installed in the mobile terminal 2. In a case where the application program is driven, light emitting is maintained by the lighting section and imaging is started by the imaging section, and such a state is displayed on the display. Furthermore, in a case where input is performed on the operation button and the touch panel of the mobile terminal 2, a close-up image of a target that is lighted by the lighting section is acquired.

Figure 2:
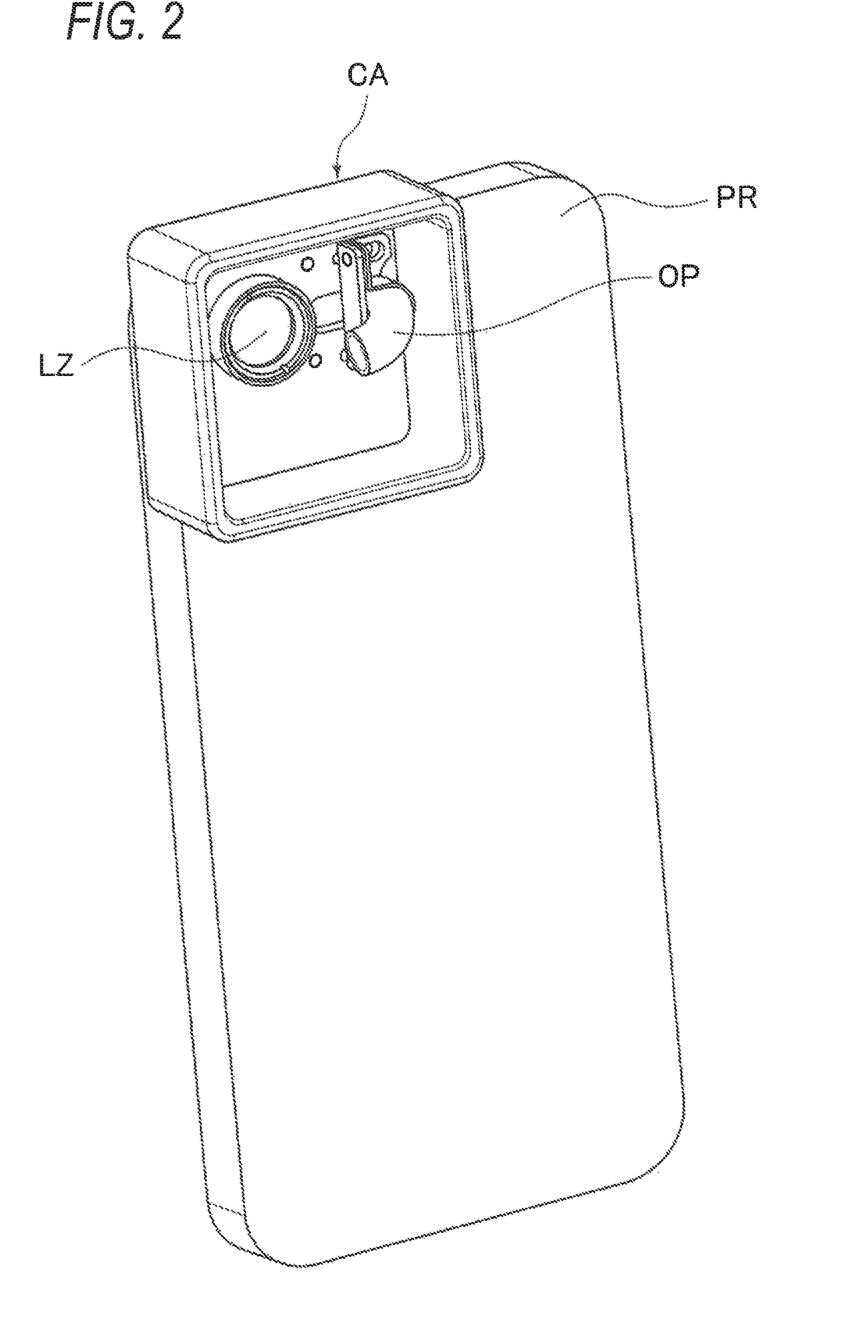
FIG. 2 is a view illustrating an outline of an imaging unit according to the first exemplary embodiment.

Here, specifically, FIG. 2 is a view illustrating an inside of the case CA of closing-up imaging of the imaging unit 3 according to the exemplary embodiment. The case CA of closing-up imaging of the imaging unit 3 is detachably fixed to the attachment member PR in the locations of the imaging section and the lighting section of the mobile terminal 2, and includes the lens section LZ and the optical member OP.

The lens section LZ includes a close-up lens (macro lens) that reduces the shortest imaging distance of the imaging section of the mobile terminal 2, and a cylindrical member that holds the close-up lens. The lens section LZ is disposed in the location corresponding to the imaging section of the mobile terminal 2. Specifically, the lens section LZ is fixed such that an optical axis of the close-up lens matches the optical axis of the optical system of the imaging section of the mobile terminal 2.

The optical member OP supplies illumination light to a close-up part of the target (an area on which the close-up imaging is performed by the imaging section of the mobile terminal 2 and the optical system using the lens section LZ, and is taken as an image) from which the close-up image is acquired. In the exemplary embodiment, the optical member OP includes a light-guiding member that guides light such that a direction through which illumination light from the lighting section progresses is changed. The light-guiding member guides illumination light from the lighting section of the mobile terminal 2 to a side of an end of the lens section LZ from the lighting section. Specifically, the light-guiding member effectively takes illumination light from the lighting section from the location of the lighting section of the mobile terminal 2 (where a light incident surface of the light-guiding member is attached to face the lighting section), and guides light while repeating full reflection and refraction inside the light-guiding member. Illumination light from the lighting section is guided by the optical member OP that extends in a tubular shape so as to reach a location which is a side of the target rather than the end of the side of the target of the lens section LZ, and illumination light is emitted to the close-up part which is located below the lens section LZ. There are many cases where the imaging section and the lighting section of the mobile terminal 2 are disposed to be close to each other. In a case where the optical member OP does not exist, illumination light which faces the close-up part is blocked by the lens section LZ. However, since the optical member OP exists that extends to a location, which is the side of the target rather than the end of the side of the target of the lens section LZ, from the lighting section, illumination light is guided and emitted to the location which is the side of the target rather than the end of the lens section LZ, and thus it is possible to supply illumination light acquired by the lighting section of the mobile terminal 2 to the close-up part without delay. Meanwhile, it is preferable that the optical member OP is a light-guiding member which has a tubular shape (a cylindrical shape, a polygonal shape, or the like).

Figure 3:
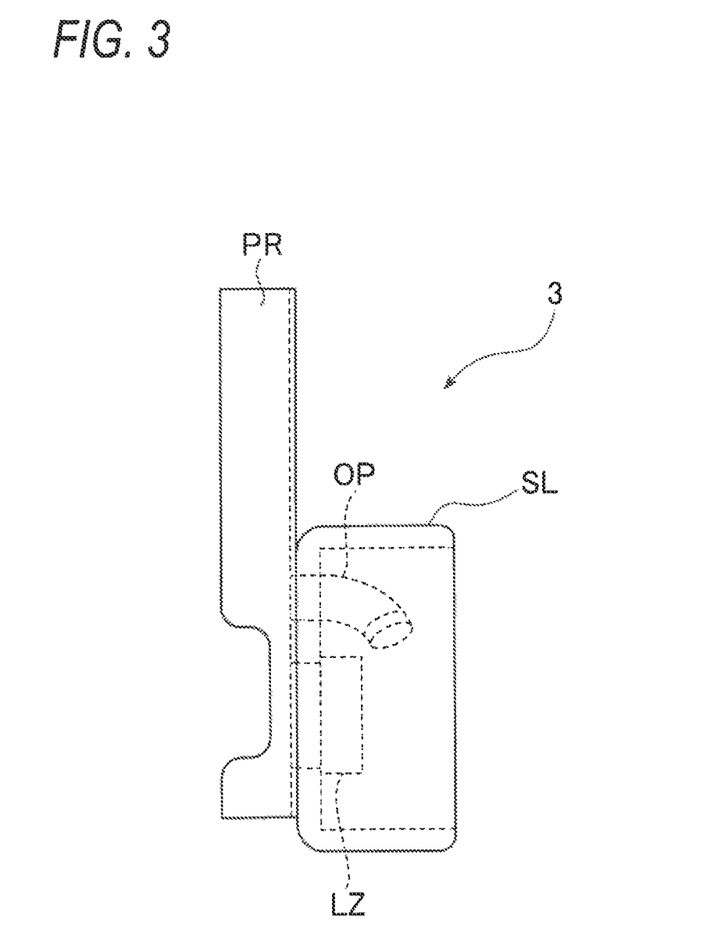
FIG. 3 is a view illustrating a sectional state of a case of closing-up imaging of the imaging unit according to the first exemplary embodiment.

FIG. 3 is a view illustrating a sectional state of the case CA of closing-up imaging of the imaging unit 3 according to the first exemplary embodiment, and the optical member OP will be described in further detail with reference to the drawing. The optical member OP is formed such that a light emission surface exists on a side closer to the target than the end of the side of the target of the lens section LZ, and the close-up part is directly irradiated with illumination light from the light emission surface of the optical member OP (a principal ray from the optical member OP is irradiated in an oblique direction to face below the lens section LZ). The principal ray refers to a ray which passes through a center of light flux of illumination light which is supplied from the optical member OP to the target on which the close-up imaging is performed. In the exemplary embodiment, the principal ray refers to a ray that passes through a central axis of the optical member OP and progresses to the outside in a central axis direction. In addition, in the exemplary embodiment, the lens section LZ does not exist on extension of the cylindrical optical member OP. Specifically, the lens section LZ does not exist in a space corresponding to the same radius as the light emission surface centering on an optical path of the principal ray from the optical member OP. In addition, in the exemplary embodiment, an upper end and a lower end of the light emission surface of the optical member OP are formed on a side which is closer to the target than the end of the lens section LZ. However, at least a part of the light emission surface of the optical member OP may be projected to the side of the target rather than the end of the lens section LZ, and a part of the light emission surface of the optical member OP may exist on a side of the mobile terminal 2 rather than the end of the side of the target of the lens section LZ. In addition, furthermore, the case CA of closing-up imaging according to the exemplary embodiment includes a shading member SL that blocks light from outside and has a box-shaped structure. The case CA of closing-up imaging is formed such that the optical member OP and the lens section LZ are involved in the shading member SL. The shading member SL blocks external light that reaches the close-up part, and, furthermore, includes a rectangular end surface (box-shaped edge part) that is formed to be parallel to the rear surface of the mobile terminal 2. The lens section LZ is disposed using the end surface, and thus it is easy to locate the target in a focal depth of the optical system, in which the shortest imaging distance is reduced.

Figure 4A:
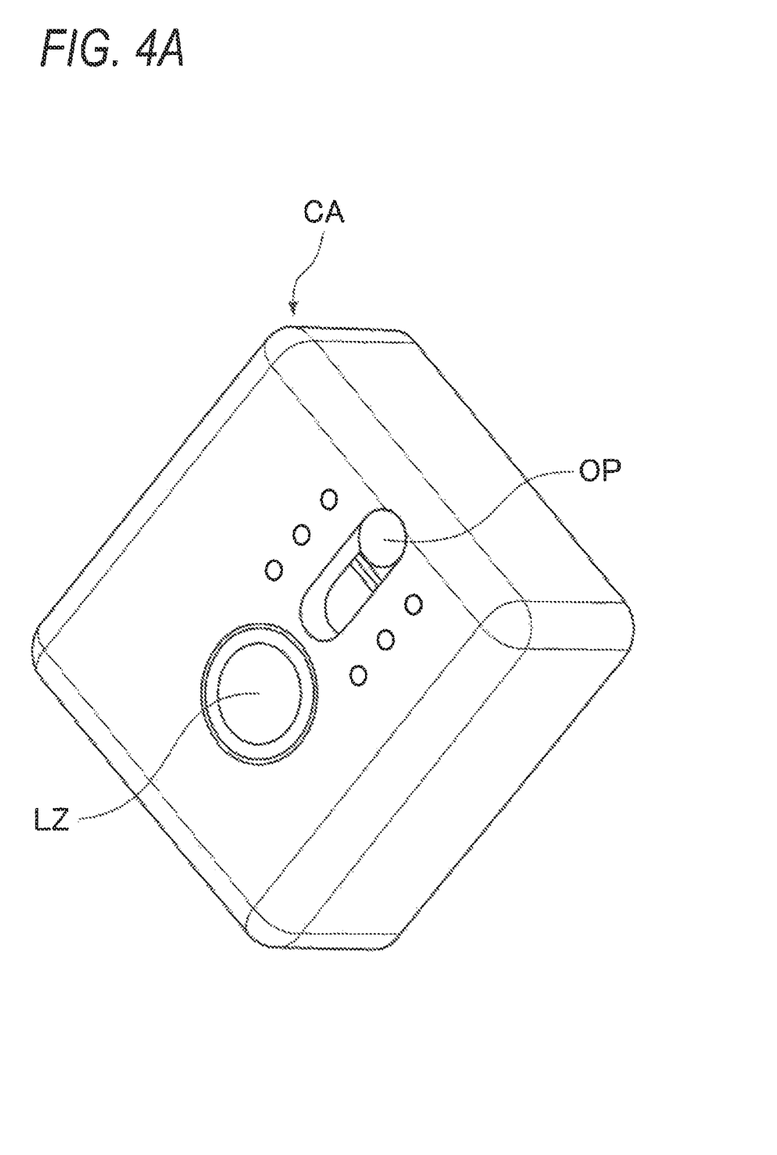
FIG. 4A is a view illustrating an upper surface of the case of closing-up imaging detached from the imaging unit according to the first exemplary embodiment.

In addition, the imaging unit 3 according to the exemplary embodiment includes a mechanism that is capable of adjusting a position at which the light from the lighting section enters the optical member OP, and is capable of corresponding to various dispositions and specifications of the lighting section of the mobile terminal 2. FIG. 4A is a view illustrating a state of an upper surface of the case CA of closing-up imaging which is detached from the imaging unit 3, and FIGS. 4B and 4C are views illustrating states in which the location of the optical member OP in the case CA of closing-up imaging is changed.

Figure 4B:
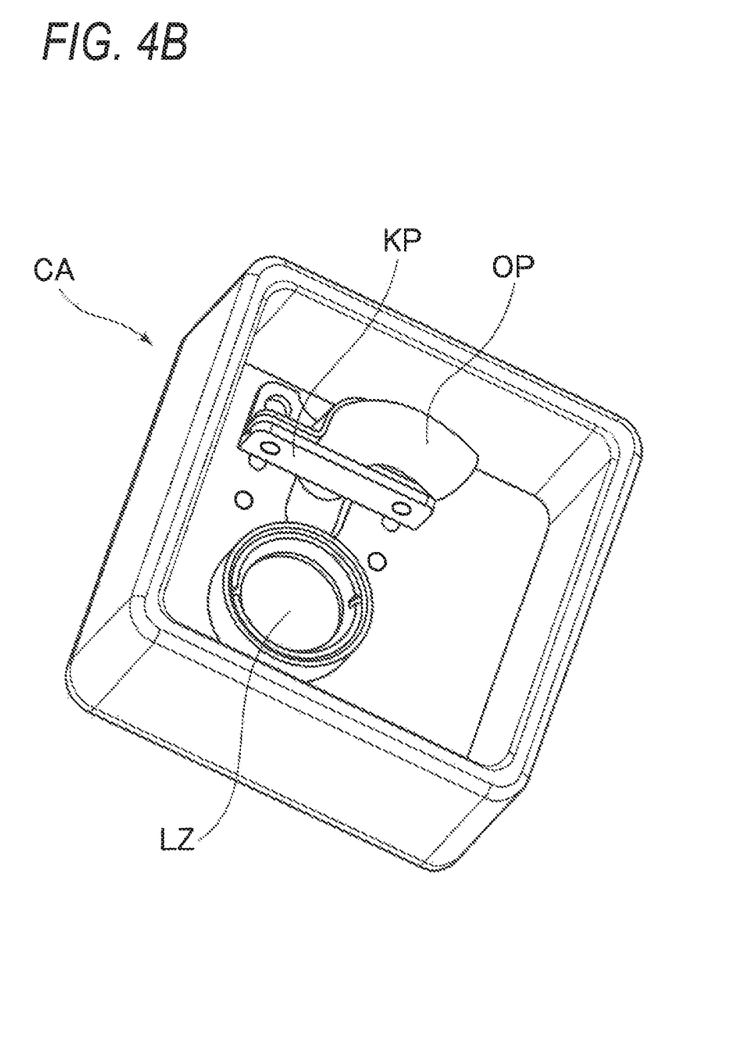
FIG. 4B is a view illustrating a state of an inside of the case of closing-up imaging according to the first exemplary embodiment.
Figure 4C:
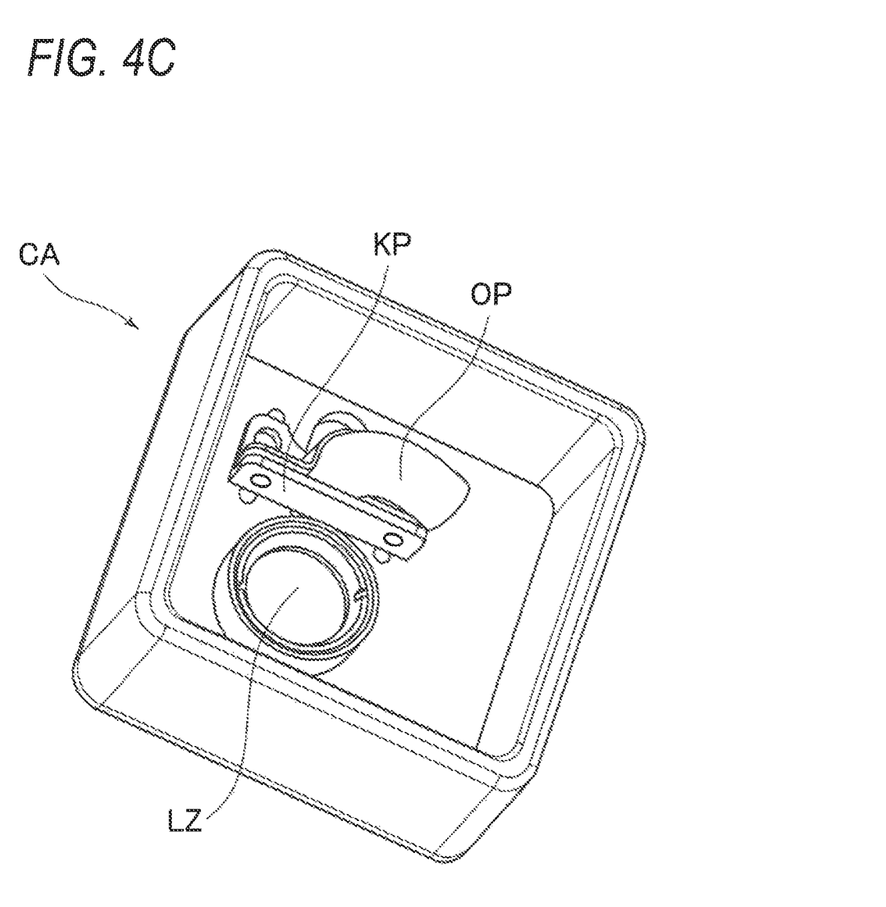
FIG. 4C is a view illustrating the state of the inside of the case of closing-up imaging according to the first exemplary embodiment.

As being illustrated in FIGS. 4A to 4C, in the imaging unit 3 according to the exemplary embodiment, a groove that slides the optical member OP to a side and three sets of holes are disposed on a substrate to which the lens section LZ is embedded and fixed. The optical member OP is fixed in the case CA of closing-up imaging by an optical member holding section KP, and is fixed to any one of three locations in such a way that a pair of projection sections of the optical member holding section KP are inserted into any one of the three sets of holes. In addition, the optical member OP according to the exemplary embodiment is held to be rotated by the optical member holding section KP, and thus a direction in which illumination light is emitted by the optical member OP is freely determined. Meanwhile, the optical member OP may change the location and the direction of the light emission surface by freely changing a bending angle. In this case, at least a part of the light emission surface of the optical member OP may be projected to the side of the target rather than the end of the lens section LZ.

In addition, although the mechanism that is capable of adjusting the location in which the optical member OP is disposed is disclosed in FIGS. 4A to 4C, a mechanism that is capable of adjusting the location in which the lens section LZ is disposed may be provided. Similarly to the case of the optical member OP, a groove that slides the lens section LZ and plural sets of holes may be disposed in the mechanism that is capable of adjusting the location in which the lens section LZ is disposed. Furthermore, a ring-shaped member that holds the close-up lens may include a pair of projection parts.

Figure 5:
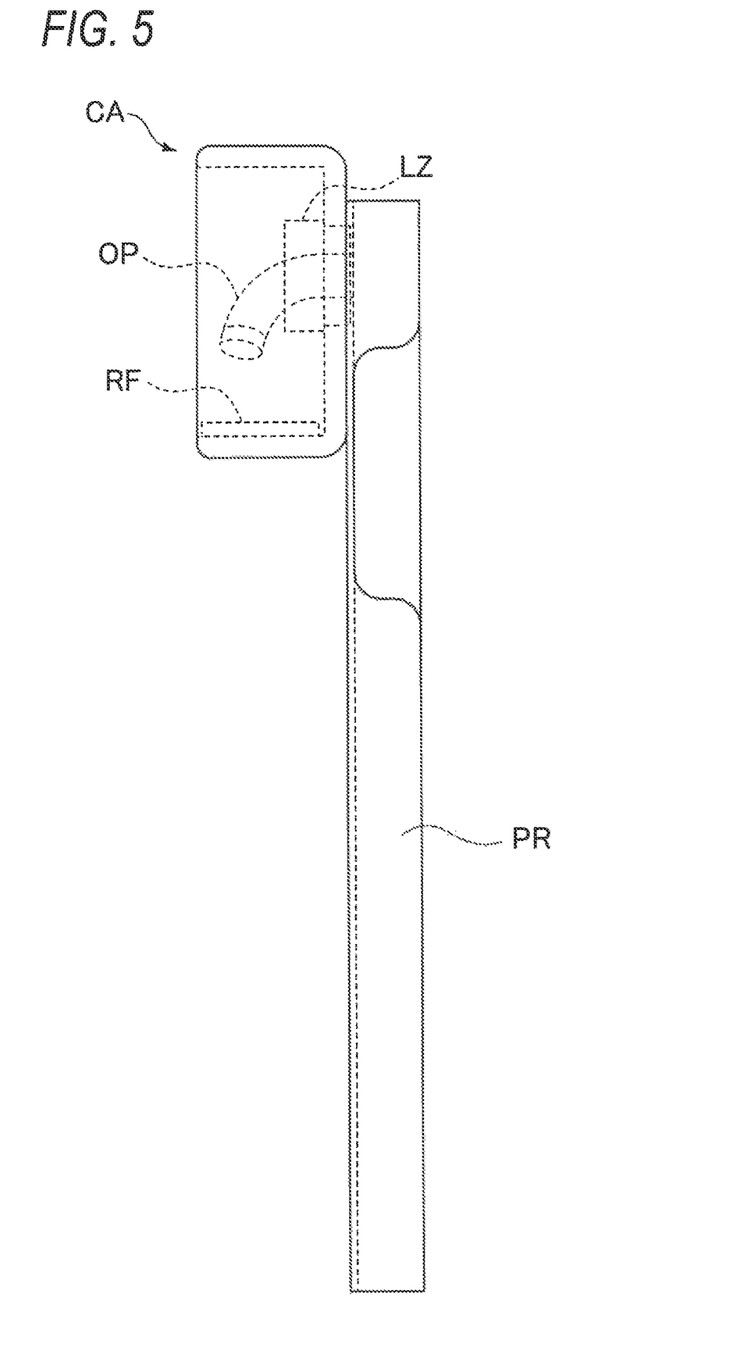
FIG. 5 is a view illustrating an imaging system according to a modification example of the first exemplary embodiment.

Subsequently, FIG. 5 is a view illustrating an imaging system 1 according to a modification example of the exemplary embodiment. As being illustrated in the drawing, in a case CA of closing-up imaging according to the modification example, a reflection member RF is disposed on an inner wall surface, which is a side of the lens section LZ, so as to reflect illumination light emitted from the optical member OP and to cause illumination light to face the close-up part which is located below the lens section LZ. In the modification example, the optical member OP is held to be rotated by the optical member holding section KP, and the reflection member RF is disposed over a whole area of the inner wall surface of the case CA of closing-up imaging such that, in a case where the optical member OP emits illumination light in any direction, reflection light may be produced to face the close-up part of the close-up target.

Second Exemplary Embodiment

Subsequently, an imaging system 1 according to a second exemplary embodiment will be described.

Figure 6A:
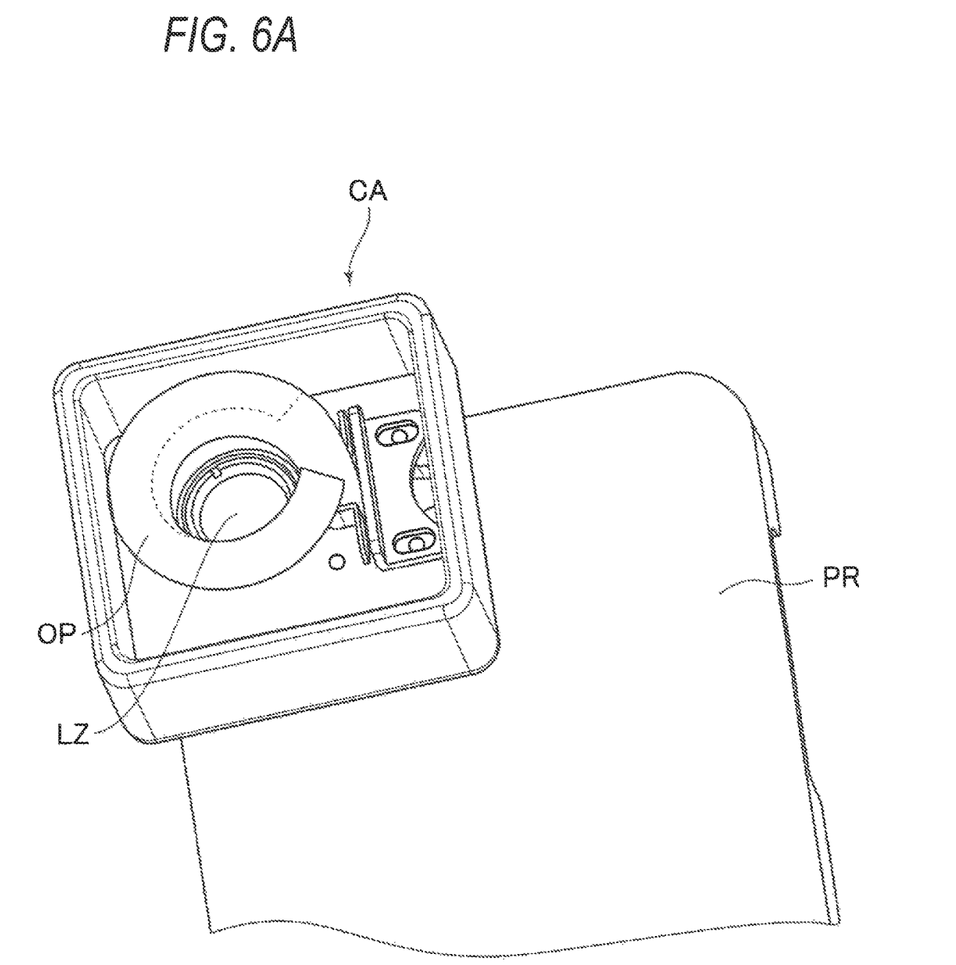
FIG. 6A is a view illustrating an outline of an imaging unit according to a second exemplary embodiment.
Figure 6B:
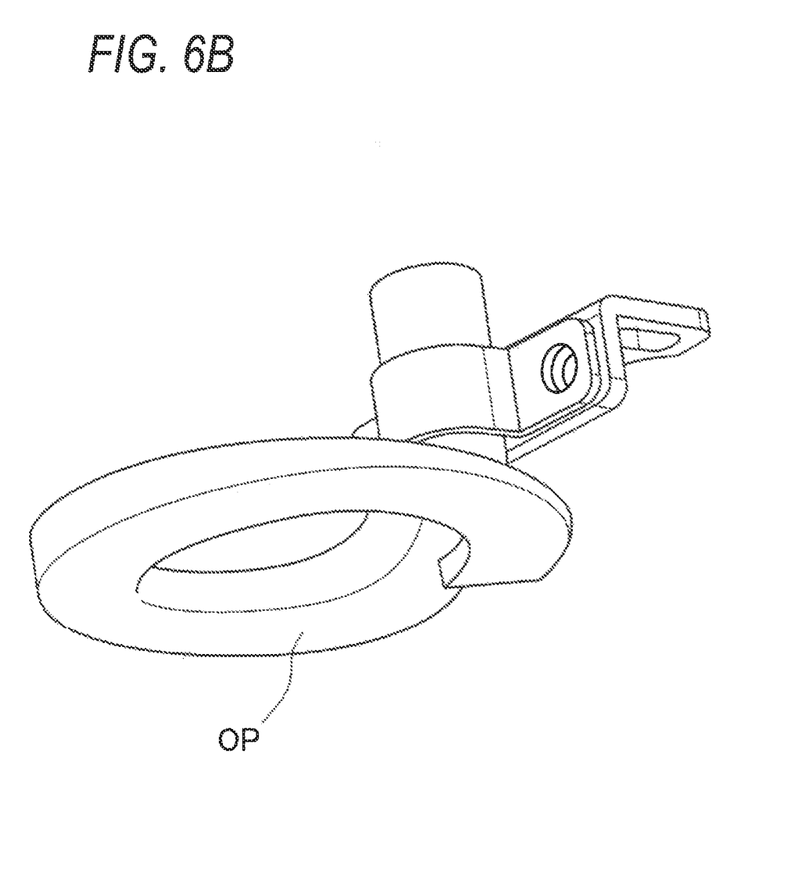
FIG. 6B is a view illustrating a state of ring lighting of the imaging unit according to the second exemplary embodiment.
Figure 6C:
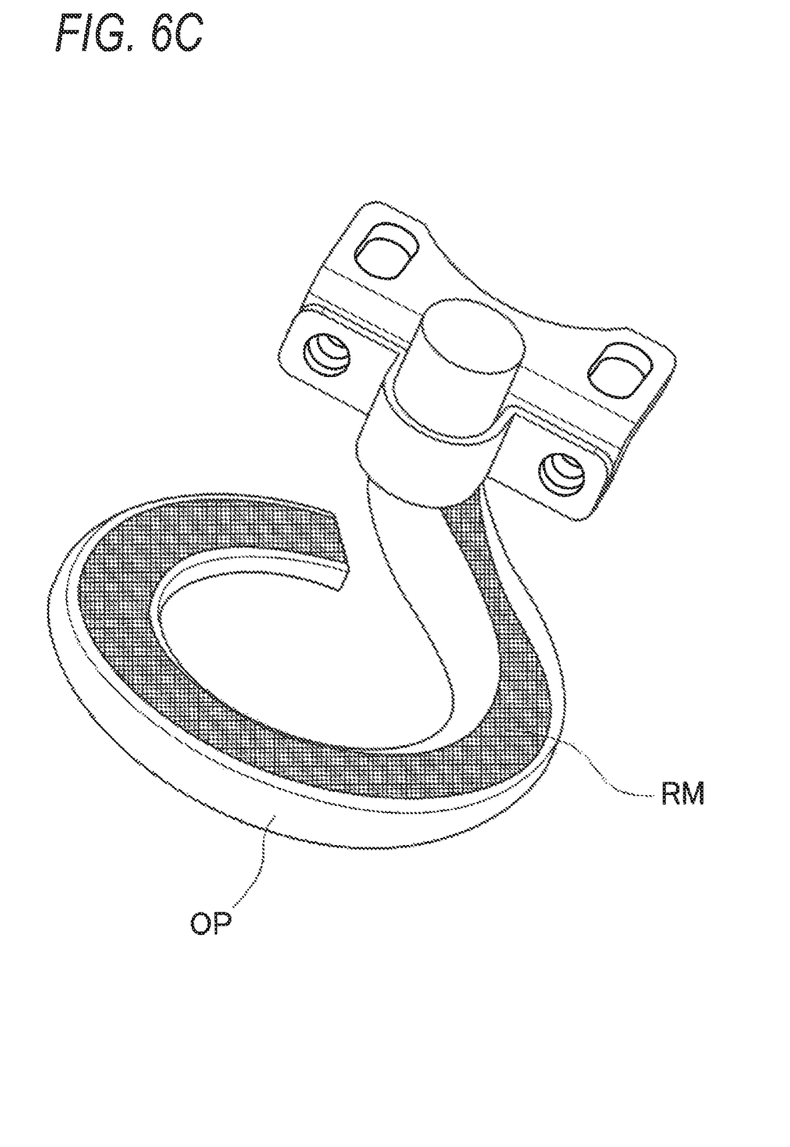
FIG. 6C is a view illustrating the state of the ring lighting of the imaging unit according to the second exemplary embodiment.

FIG. 6A is a view illustrating an outline of an imaging unit 3 according to the second exemplary embodiment, and FIGS. 6B and 6C are views illustrating a state of an optical member OP of the imaging unit 3.

As being illustrated in FIGS. 6A and 6B, in the imaging system 1 according to the second exemplary embodiment, the optical member OP emits light in a ring shape. That is, in a case CA of closing-up imaging of the imaging unit 3 according to the second exemplary embodiment, the optical member OP is disposed that is stretched to draw a circular arc in a location, which is a side of a target rather than an end of a lens section LZ on the side of the target, and that emits light through a ring-shaped light emission surface.

In the optical member OP according to the second exemplary embodiment, a film is formed on a part except an illumination light incident surface of the mobile terminal 2 and a light emission surface that emits illumination light to the outside, and illumination light is guided inside the optical member OP while repeating full reflection and refraction. In addition, as being illustrated in FIG. 6C, in the optical member OP according to the second exemplary embodiment, a reflection member RM is disposed on a side opposite to the ring-shaped light emission surface of the optical member OP. The reflection member RM is formed on a back side of the light emission surface of the optical member OP and has a ring shape. In addition, as being illustrated in FIG. 6B or the like, the optical member OP that guides illumination light from the lighting section of the mobile terminal 2 and emits illumination light in a ring shape is formed to gradually have a thin thickness toward the end. (the optical member OP is formed to become a wedge shape at a part which extends in a ring shape), and thus emission light becomes uniform on a lower surface of the optical member OP.

Although the second exemplary embodiment is different from the first exemplary embodiment in a fact that the above-described optical member OP is included, the second exemplary embodiment is approximately the same as the first exemplary embodiment as for the rest, and thus description thereof will not be repeated.

Third Exemplary Embodiment

Subsequently, an imaging system 1 of according to a third exemplary embodiment of the present invention will be described.

Figure 7:
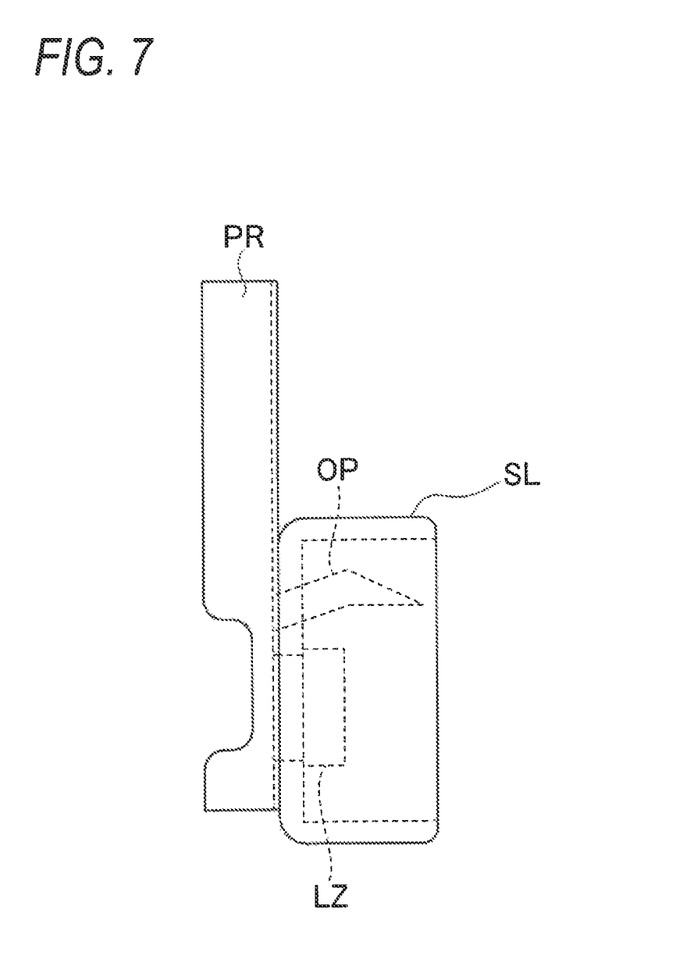
FIG. 7 is a view illustrating a sectional state of a case of closing-up imaging of an imaging unit according to a third exemplary embodiment.

FIG. 7 is a view illustrating a sectional state of a case CA of closing-up imaging of an imaging unit 3 according to a third exemplary embodiment. As being illustrated in the drawing, an optical member OP of the imaging unit 3 according to the third exemplary embodiment is different from that of the first exemplary embodiment in a fact that the optical member OP is formed by an optical system in which a mirror is disposed on an inner wall surface of a cylindrical body that includes a hollow inside. Similarly to the first exemplary embodiment, the optical member OP according to the third exemplary embodiment extends to a location which becomes a side of a target rather than an end of the lens section LZ on the side of the target, and guides illumination light from the lighting section of the mobile terminal 2 to the relevant location.

Although the third exemplary embodiment is different from the first exemplary embodiment in a fact that the above-described optical member OP is included, the third exemplary embodiment is approximately the same as the first exemplary embodiment as for the rest, and thus description thereof will not be repeated.

Fourth Exemplary Embodiment

Subsequently, an imaging system 1 according to a fourth exemplary embodiment of the present invention will be described.

Figure 8:
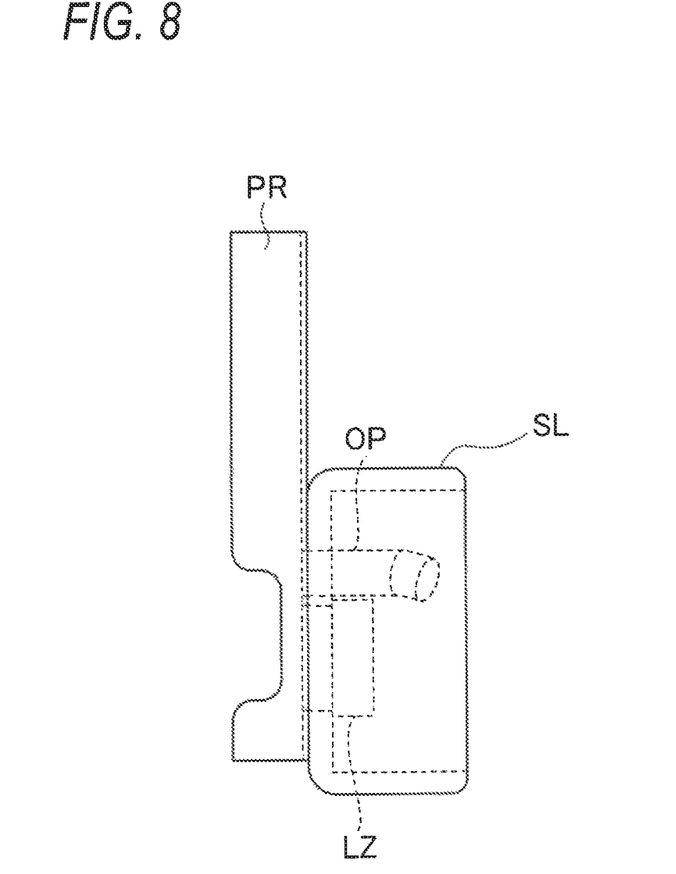
FIG. 8 is a view illustrating a sectional state of a case of closing-up imaging of an imaging unit according to a fourth exemplary embodiment.

FIG. 8 is a view illustrating a sectional state of a case CA of closing-up imaging of an imaging unit 3 according to the fourth exemplary embodiment. As being illustrated in the drawing, a fact that an optical axis of an optical member OP of the imaging unit 3 according to the fourth exemplary embodiment extends to be perpendicular to an optical axis of an imaging section of a mobile terminal 2 and an optical system using a lens section LZ and the optical member OP is bent to be inclined in a location, which is a side of a target rather than an end of the lens section LZ, is different from the first exemplary embodiment or the like. The imaging system 1 according to the fourth exemplary embodiment has the same configuration as in the first exemplary embodiment as for the rest, and thus description thereof will not be repeated.

Meanwhile, the present invention is not necessarily limited to a case where an optical axis of a principal ray emitted from the optical member OP is oblique to the optical axis of the imaging section of the mobile terminal 2 and the optical system using the lens section LZ. A case where the principal ray emitted from the optical member OP progresses to be parallel to the optical axis of the imaging section of the mobile terminal 2 and the optical system using the lens section LZ is included in the scope of the present invention.

Meanwhile, in each of the exemplary embodiments, external light is blocked by the case CA of closing-up imaging. However, the box-shaped shading member may not exist and external light may not be blocked. In addition, the imaging target of the imaging system 1 according to each of the exemplary embodiments may be skin of a human or others in which details are necessary to be inspected or observed.

In addition, the imaging system 1 according to each of the exemplary embodiments may be used as an authenticity evaluation apparatus that acquires a pattern (for example, paper fingerprint information), which appears on a surface of an imaging target including an object, such as paper, plastic, a tablet, and a metal component, using the imaging section of the mobile terminal 2 and the lens section LZ of the imaging unit 3, and uses the pattern information for originality verification. In addition, in this case, it is desired that illumination light from the optical member OP is supplied in an oblique direction, and external light is blocked by a box-shaped structure such as the case CA of closing-up imaging. In addition, in this case, illumination light from the optical member OP may be supplied to the close-up part through the reflection member RF illustrated in FIG. 5. Furthermore, it is desired that a principal ray from the optical member OP is incident at an angle which is equal to or larger than 10 and equal to or smaller than 80 or at an angle which is equal to or larger than 20 and equal to or smaller than 70 based on the imaging section of the mobile terminal 2 and the optical axis of the lens section LZ.

Meanwhile, in the first exemplary embodiment, the mechanism that is capable of adjusting the location of the optical member OP is included. However, for example, a mechanism that is capable of adjusting the location of the case CA of closing-up imaging may be included such that it is possible to adjust the locations of the lens section LZ and the optical member OP.

Meanwhile, in each of the exemplary embodiments, the imaging unit 3 includes the close-up lens section LZ, and the attachment member PR, the lens section LZ, and the optical member OP are integrally provided by the imaging unit 3. However, for example, the lens section LZ may be included in advance in the imaging section of the mobile terminal 2. In addition, in a latter case, a detachable close-up lens section LZ may be included in the imaging section, and an detachable close-up lens section LZ may be included in advance in the imaging section.

INDUSTRIAL APPLICABILITY

It is useful to use at least one exemplary embodiment of the present invention for close-up imaging performed by, for example, the mobile terminal such as a smart phone.

The present invention is not limited to the above-described exemplary embodiment and various modifications are possible. In the scope of the spirit of the present invention, those skilled in the art may devise various changed examples and corrected examples and it is understood that the changed examples and the corrected examples belong to the scope of the present invention. In addition, for example, appropriate addition and removal of components, change of design, addition and omission of steps, or change of conditions performed by those skilled in the art on each exemplary embodiment is included in the scope of the present invention without departing from the gist of the present invention.

The description of embodiments may disclose the following matters.

[1] An imaging unit includes: an attachment member that is attached to a mobile terminal including an imaging section and a lighting section, the imaging section including a lens section that closes up a target; and an optical member that guides illumination light from the lighting section, from the lighting section of the mobile terminal toward the target rather than an end of the lens section on a side of the target.

[2] An imaging unit includes: an attachment member that is attached to a mobile terminal including an imaging section and a lighting section, the imaging section including a lens section that closes up a target; and an optical member that is located from the lighting section of the mobile terminal toward the target over an end of the lens section on a side of the target and guides illumination light from the lighting section.

[3] The imaging unit according to [1] or [2] may further include: a first adjustment mechanism that adjusts a position at which the light from the lighting section enters the optical member.

[4] In the imaging unit according to [1] or [2], the optical member may extend to draw a circular arc from the lighting section toward the target to form a ring shape that emits light.

[5] In the imaging unit according to [4], the optical member may extend to draw the circular arc at a side of the target rather than the end of the lens section on the side of the target, to form the ring shape that emits light.

[6] An imaging system including: a mobile terminal that includes an imaging section and a lighting section, the imaging section including a lens section that closes up a target; and an imaging unit that is attached to the mobile terminal, wherein the imaging unit includes an optical member that guides illumination light from the lighting section, from the lighting section of the mobile terminal toward the target rather than an end of the lens section on a side of the target.

What is claimed is:

1. An imaging unit comprising:
an attachment member that is attached to a mobile terminal that comprises an imaging section and a lighting section;
a lens section that is disposed at a position corresponding to the imaging section of the mobile terminal and closes up a target;
an optical member that guides illumination light from the lighting section, from the lighting section of the mobile terminal toward the target rather than an end of the lens section on a side of the target;
a shading member configured to cover to the lens section and the optical member, the shading member being configured to block only external light from reaching the lens section; and
a reflection member disposed over a whole area of an inner wall surface of the shading member.

2. An imaging unit comprising:
an attachment member that is attached to a mobile terminal that comprises an imaging section and a lighting section;
a lens section that is disposed at a position corresponding to the imaging section of the mobile terminal and closes up a target;
an optical member that extends from the lighting section of the mobile terminal toward the target rather than an end of the lens section on a side of the target and guides illumination light from the lighting section;
a shading member configured to cover to the lens section and the optical member, the shading member being configured to block only external light from reaching the lens section; and
a reflection member disposed over a whole area of an inner wall surface of the shading member.

3. The imaging unit according to claim 1, further comprising:

a first adjustment mechanism that adjusts a position at which the light from the lighting section enters the optical member.

4. The imaging unit according to a claim 2, further comprising:
a first adjustment mechanism that adjusts a position at which the light from the lighting section enters the optical member.

5. The imaging unit according to claim 1, further comprising:
a second adjustment mechanism that adjusts the position where the lens section is disposed.

6. The imaging unit according to claim 2, further comprising:
a second adjustment mechanism that adjusts the position where the lens section is disposed.

7. The imaging unit according to claim 1, wherein
the optical member extends to draw a circular arc from the lighting section toward the target to form a ring shape that emits light.

8. The imaging unit according to claim 2, wherein
the optical member extends to draw a circular arc from the lighting section toward the target to form a ring shape that emits light.

9. The imaging unit according to claim 7, wherein
the optical member extends to draw the circular arc at a side of the target rather than the end of the lens section on the side of the target, to form the ring shape that emits light.

10. The imaging unit according to claim 8, wherein
the optical member extends to draw the circular arc at a side of the target rather than the end of the lens section on the side of the target, to form the ring shape that emits light.

11. An imaging system comprising:
a mobile terminal that comprises an imaging section and a lighting section; and
an imaging unit that is attached to the mobile terminal, wherein the imaging unit comprises:
a lens section that is disposed at a position corresponding to the imaging section of the mobile terminal and closes up an imaging target;
an optical member that guides illumination light from the lighting section, from the lighting section of the mobile terminal toward the target rather than an end of the lens section on a side of the target;
a shading member configured to cover to the lens section and the optical member, the shading member being configured to block only external light from reaching the lens section; and
a reflection member disposed over a whole area of an inner wall surface of the shading member.

12. The imaging unit according to claim 1, wherein the shading member comprises an end surface that is disposed within a focal depth of the optical member.

13. The imaging unit according to claim 2, wherein the shading member comprises an end surface that is disposed within a focal depth of the optical member.

14. The imaging system according to claim 11, wherein the shading member comprises an end surface that is disposed within a focal depth of the optical member.

15. The imaging unit according to claim 3, wherein
the lens section is fixed to the shading member, and
the first adjustment mechanism is provided on the shading member to adjust a position of the optical member on the shading member to the position at which the light from the lighting section enters to the optical member.

16. The imaging unit according to claim 4, wherein
the lens section is fixed to the shading member, and
the first adjustment mechanism is provided on the shading member to adjust a position of the optical member on the shading member to the position at which the light from the lighting section enters to the optical member.

17. The imaging unit according to claim 11, wherein
the lens section is fixed to the shading member, and
the imaging unit further comprises a first adjustment mechanism provided on the shading member, the first adjustment mechanism configured to adjust a position of the optical member on the shading member to the position at which the light from the lighting section enters to the optical member.

\* \* \* \* \*